Aug. 20, 1957 P. BUKOFF 2,803,222
RETRACTING MECHANISM FOR AIRCRAFT LANDING GEAR
Filed Nov. 12, 1953 2 Sheets-Sheet 1
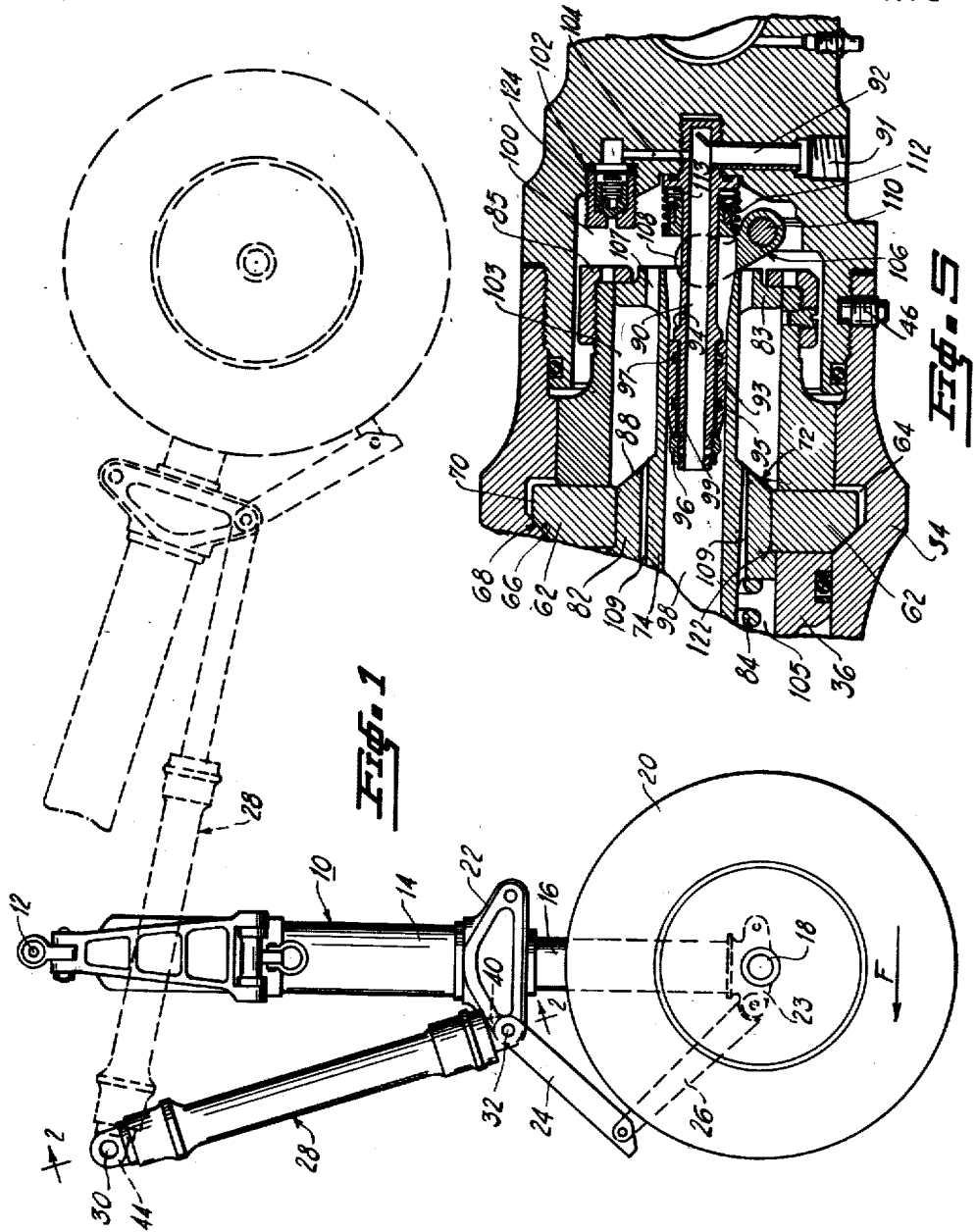
INVENTOR.
PETER BUKOFF
BY
*T. H. Murray*
AGENT

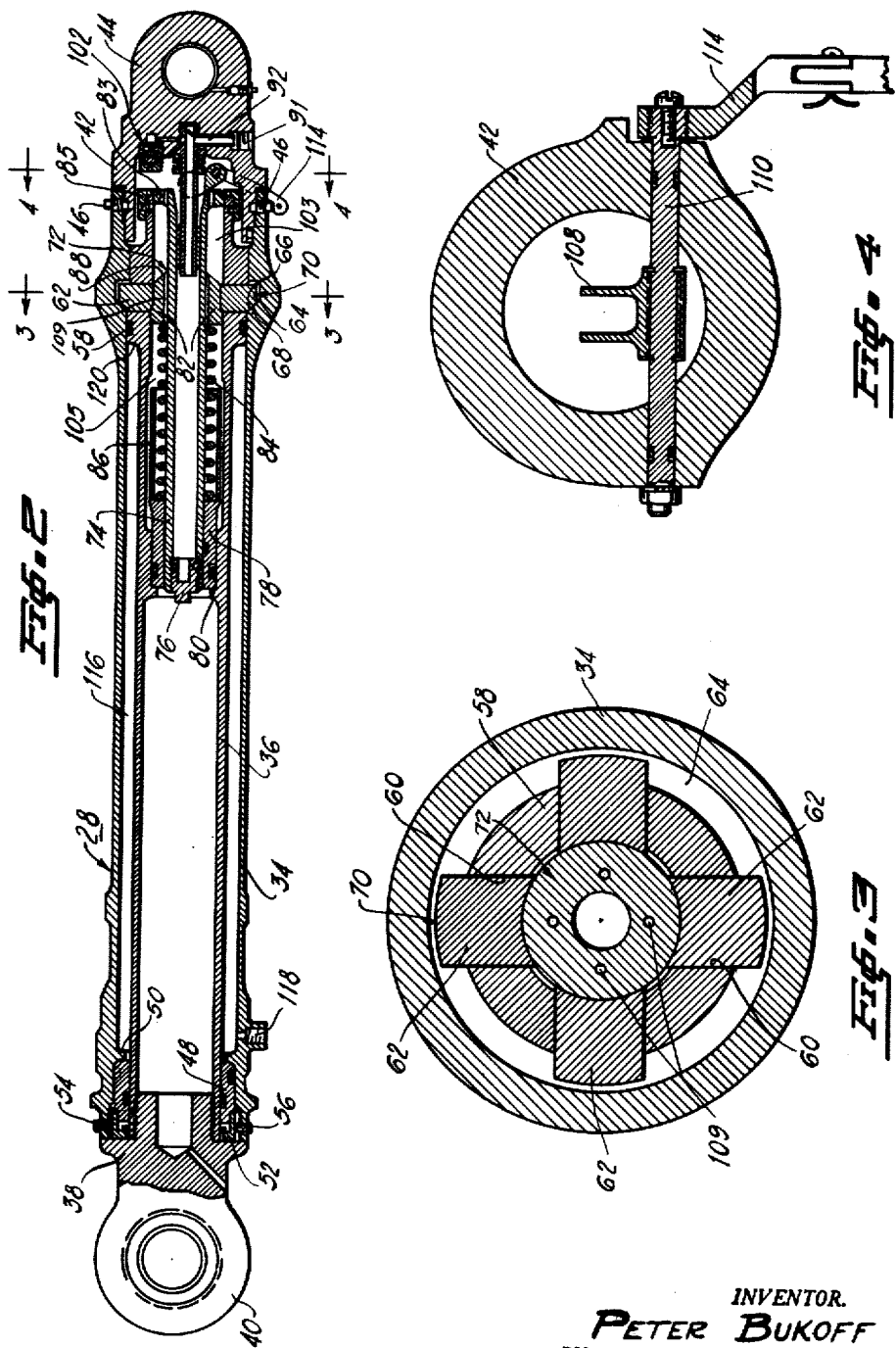

United States Patent Office 2,803,222
Patented Aug. 20, 1957

2,803,222

RETRACTING MECHANISM FOR AIRCRAFT LANDING GEAR

Peter Bukoff, South Bend, Ind., assignor to Bendix Aviation Corporation, South Bend, Ind., a corporation of Delaware Application November 12, 1953, Serial No. 391,540

10 Claims. (Cl. 121—40)

This invention relates to a mechanism for retracting the landing gear of an aircraft into the space provided in the aircraft wing or fuselage and more particularly to a retracting mechanism which incorporates a device for locking the landing gear in either its retracted or extended position.

The retracting mechanism of the present invention is of the general type employing a pair of telescoping elements which are responsive to fluid pressure in expanding or contracting the unit in length. That is, fluid pressure is used to move one telescoping element within the other. As will become apparent from the following description, it is sometimes necessary to lock one telescoping element to the other in order to fix the landing strut in its retracted or extended position.

Accordingly, it is an object of this invention to provide a locking device for a retracting mechanism of the type described above.

Another object of the invention is to provide a locking device for a retracting mechanism which is actuable by the same source of fluid pressure which is used to actuate the retracting mechanism itself.

An important feature of the invention lies in the provision of a sequence locking device for a retracting mechanism which will unlock before fluid pressure is permitted to actuate the locking mechanism itself. In this way the undesirable high rubbing pressures between the locking means and telescoping elements are eliminated which would otherwise occur if an attempt were made to unlock the elements while pressurizing the mechanism to move one element with respect to the other.

A still further object of the invention is to provide a locking device for a retracting mechanism which will automatically lock the mechanism at a predetermined position of the landing strut.

The above and other objects and features of the invention will become apparent from the following description taken in connection with the accompanying drawings which form a part of this specification and in which:

Figure 1 is a view of a conventional aircraft landing strut of the type with which the retracting mechanism of the present invention may be used;

Figure 2 is a sectional view taken along the axis of the retracting mechanism as represented by the line 2—2 of Figure 1;

Figure 3 is a section taken along line 3—3 of Figure 2 showing the locking dogs of the invention;

Figure 4 is a section taken along line 4—4 of Figure 2 showing the means for indicating the locked position of the retracting mechanism; and Figure 5 is an enlarged view of the extreme right end of the section of the retracting mechanism shown in Figure 2.

Referring to Figure 1, a conventional shock strut 10 is shown having a pivot 12 at its upper extremity arranged for connection to the underside of an aircraft, not shown. The shock strut comprises an upper or outer cylinder 14 within which is received for telescoping action an inner cylinder 16. At the lower extremity of cylinder 16 is carried a laterally extending axle 18 which, in turn, supports a wheel 20. A compressible shock absorbing means is interposed between cylinders 14 and 16 so that as weight is applied to wheel 20 when the aircraft alights on the ground, cylinder 16 will telescope into cylinder 14 to thereby take the initial impact of landing. Between bracket 22, positioned at the lower extremity of cylinder 14, and lug 23 on cylinder 16 are positioned a pair of expansion linkages 24 and 26 which prevent relative rotation between the cylinders while permitting the aforesaid telescoping action.

In order to retract the strut into the space provided in the aircraft wing or fuselage, a retracting mechanism 28 is provided to rotate the strut counterclockwise about pivot 12. The retracting mechanism is carried for arcuate motion between pivot 30 on the underside of the aircraft and pivot 32 on bracket 22. It comprises, essentially, a unit having a pair of telescoping tubular elements which are responsive to fluid pressure in expanding or contracting the unit in length. Retraction of the strut and wheel is in an arc away from the direction of forward movement of the wheel (arrow F) so that the retracted position of the strut is substantially that shown in dotted lines. In the extended position of the landing gear (shown in full lines) some means must be provided to lock the telescoping elements of the retracting mechanism in order to prevent collapse of the strut when the aircraft alights on the ground. That is, the retracting mechanism must be locked in order that it can take the spring back load on the wheel which would otherwise tend to rotate the landing gear about pivot 12. The locking means for the mechanism comprises the principal part of this invention.

Referring to Figure 2, the retracting mechanism 28 includes an outer cylinder 34 and a piston member 36 which is received within the outer cylinder for reciprocating movement. Threaded into the left end of piston member 36 is an end closure 38 having a clevis 40 integral therewith. At the right end of cylinder 34 is a similar end closure 42 and clevis 44. End closure 42 is locked to cylinder 34 by set screws 46, and end closure 38 is locked to piston member 36 by a similar locking means, not shown. Clevises 40 and 44 are connected to pivots 30 and 32 as shown in Figure 1.

The left end of piston member 36 slides on a spacing sleeve 48 which is held within the end of cylinder 34 between annular flange 50 and retaining ring 52. Set screws 54 and 56 serve to lock the retaining ring within the cylinder. The right end of the piston member has an enlarged portion 58 which slides on the inner periphery of cylinder 34. Extending through a series of circumferentially spaced slots 60 in enlarged portion 58 are four dogs or lugs 62 as best shown in Figure 3. These lugs can slide into an associated annular recess 64 formed in the wall of cylinder 34 to thereby assist in locking the piston and cylinder elements together. The lugs by themselves cannot bring about a locked relationship of the elements because of the effect of companion cam surfaces 66 and 68 formed on the lugs and recess respectively (Figure 2). As piston member 36 moves to the left, cam surfaces 66 will slide on surface 68 thereby forcing the lugs radially inward until the ends 70 of the lugs coincide with the inner periphery of cylinder 34. Upon further movement of the piston to the left, ends 70 will slide on said inner periphery.

In order to hold lugs 62 in recess 64 and lock the piston member within cylinder 34 a locking mechanism, generally indicated at 72, is provided. The locking mechanism includes a tubular member 74 having an end plug 76 threaded into its left end. Member 74 slides on a packing sleeve 78 which is positioned on the inner periphery of piston member 36 against flange 80. An enlarged diameter portion 82 formed on member 74 serves to hold lugs 62 in recess 64. Between packing sleeve 78 and enlarged portion 82 is a coil spring 84 which tends to force tubular member 74 to the right. Integral with packing sleeve 78 is an axially extending sleeve 86 which limits movement of member 74 to the left by abutment with enlarged diameter portion 82. Movement of tubular member 74 to the right is limited when flange 83 abuts a collar 85 which is threaded onto the right end of piston member 36. Note that on the right end of enlarged portion 82 is a cam surface 88, the purpose of which will hereinafter be explained.

Referring to Figure 5, a conduit 90 is threaded into end closure 42 and extends into the right end of tubular member 74. Conduit 90 communicates with pressure port 91 through passage 92. A tapered sleeve 93 is carried on the inner extremity of conduit 90 between flange 94 and retaining nut 96. Sleeve 93 abuts the inner periphery of the locking member so that in the position shown in Figure 2 fluid communication between chamber 98 formed within tubular member 74 and chamber 100 is blocked. Note that between sleeve 93 and conduit 90 are interposed a pair of ring seals 95 and 97. The inner periphery of the sleeve is slightly oversize so that a small annular spacing 99 exists between the sleeve and conduit. The sleeve is also held loosely between flange 94 and retaining nut 96 so that it is substantially free floating (i. e., capable of radial movement in any direction being restrained only by the resilient seals 95 and 97). In this way the sleeve can easily align itself with the inner periphery of member 74 as the member slides over the innermost end of the sleeve without the necessity for the extremely fine tolerance requirements which would otherwise be necessary in centering these two parts. A one-way relief valve 102 communicates with pressure port 91 and passage 92 through a second passage 104. Valve 102 will permit flow to the right only (i. e., from chamber 100 into passage 104). In order to equalize the pressure in annular chambers 103 and 105 with that in chamber 100, a series of passages 107 and 109 are drilled through flange 83 and enlarged portion 82 to allow fluid communication between the chambers.

To warn the pilot in the control cockpit of the aircraft of the unlocked position of the retracting mechanism, an electrical signaling system, not shown, is provided. This system is actuated or controlled by a lever assembly 106 (Figures 4 and 5). The assembly includes a cam 108 which is splined to shaft 110 and held against the extreme right end of tubular member 74 by a coil spring 113 and washer 112. To one end of shaft 110 is fastened a lever 114 which, in turn, is connected to a switch in the signaling system. In the locked position shown in Figure 5 the switch in the signaling system will be open. However, when tubular member 74 moves to the left to unlock the mechanism, cam 108, shaft 110 and lever 114 will rotate counterclockwise due to the action of spring 113. Lever 114 will then close the switch in the signaling system to thereby warn the pilot of the unlocked condition of the retracting mechanism.

Between piston member 36 and cylinder 34 is formed an axially extending chamber 116 (Figure 2). A second fluid pressure port 118 communicates with chamber 116. Assuming that the retracting mechanism is in its extended position, fluid pressure entering port 118 will react against annular surface 120 of enlarged portion 58 to thereby force piston member 36 to the right.

Operation of the device is as follows: If a source of fluid pressure is connected through high and low pressure lines to ports 91 and 118 respectively in the position shown in Figure 2, fluid pressure will enter passage 92, conduit 90, and chamber 98 to act on end plug 76 thereby forcing member 74 to the left against the action of spring 84. The right end of member 74 will not pass the left end of sleeve 93 until enlarged portion 82 has withdrawn from lugs 62 to thereby release them from their locked position. That is, communication will not be established between chambers 98 and 100 until the retracting mechanism is unlocked. When the aforesaid communication between chambers 98 and 100 is established, fluid pressure in chamber 100 will act on the right end of piston member 36 to thereby force it to the left. Lugs 62 are, of course, free to move radially inward on cam surfaces 66 and 68 since they are no longer engaged by enlarged portion 82. Note that lugs 62 are free to move inward without creating the rubbing pressures which would otherwise occur if chamber 100 were pressurized before enlarged portion 82 released the lugs from their locked position.

In order to move the piston member to the right, the high and low pressure lines of the fluid pressure source are reversed by any suitable valve means, not shown, so that fluid under pressure will now enter port 118 to react against annular surface 120. As the piston moves to the right, cam surface 88 will abut the chamfered edges 122 (Figure 5) of lugs 62. Due to the action of spring 84 and surface 88 the enlarged portion 82 will tend to force the lugs radially outward. Therefore, when the lugs reach recess 64, they will be forced outwardly into the recess. Portion 82 will now slide between the lugs to thereby hold them in the recess and lock the piston member to outer cylinder 34.

During most of the aforesaid movement to the right, fluid will be exhausted through conduit 90 and passage 92 to low pressure port 91. Note, however, that during the final stages of movement to the right before lugs 62 reach recess 64 the extreme right end of tubular member 74 will engage sleeve 93 to restrict communication between chambers 98 and 100 and thereby prevent escape of fluid through conduit 90. In order to provide an outlet for the fluid remaining in chamber 100 which must be exhausted to enable the piston member to move further to the right, relief valve 102 is provided which will allow fluid to pass in an outward direction through passage 104. The relief valve acts also as a snubber or cushioning means in that it throttles the flow of fluid through restricted passages 124 and, therefore, impedes the final movement of piston member 36 before the unit assumes its locked position.

During operation of the retracting mechanism, lever assembly 106 will, of course, function in the manner already described so as to inform the pilot of the locked or unlocked position of the mechanism.

Although this invention has been described in connection with a specific embodiment, it will be understood by those skilled in the art that various changes in size and arrangement of parts can be made to suit requirements without departing from the spirit and scope of this invention.

Having thus described the various features of my invention what I claim as new and desire to secure by Letters Patent is:

I claim:

1. In combination, a hydraulic cylinder chamber, a tubular piston movable therein, the periphery of said piston being provided with a plurality of circumferentially spaced through-slots, a series of radially movable elements slidable in said slots, a recess formed on the inner periphery of said chamber to receive the radial outward ends of said elements, a closure for an end of the cylinder chamber, an inwardly extending conduit projecting from the end closure, a fluid pressure port in the closure arranged to communicate with said conduit, means for forcing said elements radially outward into said recess to thereby prevent relative movement between said cylinder and piston and comprising a member reciprocable within said tubular piston, a cam surface formed on said member which will force said elements radially outward upon movement of the member toward said end closure, a pressure chamber formed in said member and having an open end formed to slide over the inner extremity of said conduit when said elements are held radially extended into said recess, means carried by said inner extremity for preventing communication between said conduit and the interior of the cylinder chamber when said elements are held in their radially extended position, the extent to which said conduit extends into said pressure chamber being such that when fluid pressure is applied to the pressure chamber to force said member inwardly from said end closure, the open end of said chamber will slide past the inner extremity of said conduit only when said elements are free to move radially inwardly, and means permitting escape of fluid pressure from said cylinder chamber when communication is blocked between said conduit and the cylinder chamber.

2. In combination, a hydraulic cylinder chamber, a tubular piston movable therein, the periphery of said piston being provided with a plurality of circumferentially spaced through-slots, a series of radial movable elements slidable in said slots, a recess formed on the inner periphery of said chamber to receive the radial outward ends of said elements, a closure for an end of cylinder chamber, an inwardly extending conduit projecting from the end closure, a fluid pressure port in the closure arranged to communicate with said conduit, and means for forcing said elements radially outward into said recess to thereby prevent relative movement between said cylinder and piston and comprising a member reciprocable within said tubular piston, a pressure chamber formed in said member and having an open end formed to slide over the inner extremity of said conduit when said elements are held radially extended into said recess, means carried by said inner extremity for preventing communication between said conduits and the interior of the cylinder chamber when said elements are held in their radially extended position, the extent to which said conduit extends into said pressure chamber being such that when fluid pressure is applied to the pressure chamber to force said member inwardly from said end closure, the open end of said chamber will slide past the inner extremity of said conduit only when said elements are free to move radially inwardly.

3. In combination, a hydraulic cylinder chamber, a tubular piston movable therein, the periphery of said piston being provided with a plurality of circumferentially spaced through-slots, a series of radially movable elements slidable in said slots, a recess formed on the inner periphery of said chamber to receive the radial outward ends of said elements, a closure for an end of the cylinder chamber, an inwardly extending conduit projecting from the end closure, a fluid pressure port in the closure arranged to communicate with said conduit, and means for holding said elements radially extended into said recess to thereby prevent relative movement between said cylinder and piston and including a pressure responsive member reciprocable within said tubular piston, an axially extending pressure chamber formed in said member and having an open end formed to slide over the inner extremity of said conduit when said elements are held radially extended into said recess, said inner extremity being enlarged to abut the inner periphery of said pressure chamber whereby communication will be blocked between said conduit and the interior of the cylinder chamber when said elements are held in their radially extended position, the extent to which said conduit extends into said pressure chamber being such that movement of said member due to pressure applied to said chamber will permit radial inward movement of said elements before the open end of said chamber slides past the inner extremity of said conduit to allow fluid pressure to act on and move said piston.

4. In combination with a hydraulic cylinder chamber and a piston movable therein, means carried by said piston for locking the same to said cylinder, said cylinder having a recess formed for receiving said means, a fluid pressure conduit extending into one end of said cylinder to conduct fluid pressure into the cylinder to move said piston, a locking member responsive to pressure applied to said conduit, said member having an axially extending fluid pressure chamber therein and a radially extending projection arranged to hold said locking means in its locked position, an opening in the pressure chamber arranged to slide over the inner extremity of said conduit to thereby block communication between the conduit and the cylinder chamber when said locking means is in its locked position, said locking member being moved to release said locking means from its locked position upon application of fluid pressure to said conduit, the axial spacing between said inner extremity of the conduit and said radial projection being such that movement of the locking member due to pressure applied to said chamber will release said locking means from its locked position before said opening in the pressure chamber slides past said inner extremity to thereby allow fluid pressure to act on and move said piston, a one way relief valve in the cylinder chamber to facilitate escape of pressure from said cylinder chamber when communication is blocked between said conduit and the cylinder chamber, and a passage communicating said relief valve with said conduit.

5. In combination with a hydraulic cylinder chamber and a piston movable therein, means carried by said piston for locking the same to said cylinder, said cylinder having a recess formed for receiving said means, a fluid pressure conduit extending into one end of said cylinder to conduct fluid pressure into the cylinder to move said piston, a locking member responsive to pressure applied to said conduit and arranged to hold said locking means in its locked position, said member having an axially extending fluid pressure chamber therein, and an opening in the pressure chamber arranged to slide over the inner extremity of said conduit to thereby block communication between the conduit and the cylinder chamber when said locking means is in its locked position, said locking member being moved to release said locking means from its locked position upon application of fluid pressure to said conduit, the axial spacing between said inner extremity of the conduit and said radial projection being such that movement of the locking member due to pressure applied to said chamber will release said locking means from its locked position before said opening in the pressure chamber slides past said inner extremity to thereby allow fluid pressure to act on and move said piston.

6. In combination with a hydraulic cylinder chamber and a piston movable therein, means carried by said piston for locking the same to said cylinder, said cylinder having a recess formed for receiving said means, a fluid pressure conduit extending into one end of said cylinder to conduct fluid pressure into the cylinder to move said piston, a locking member responsive to pressure applied to said conduit and arranged to hold said locking means in its locked position, said member having an axially extending fluid pressure chamber therein, and an opening in the pressure chamber arranged to slide over the inner extremity of said conduit to thereby block communication between the conduit and the cylinder chamber when said locking means is in its locked position, said locking member being moved to release said locking means from its locked position upon application of fluid pressure to said conduit.

7. In combination with a hydraulic cylinder chamber and a piston movable therein, means carried by said piston for locking the same to said cylinder, said cylinder having a recess formed for receiving said means, a fluid pressure conduit extending into one end of said cylinder to conduct fluid pressure into the cylinder to move said piston, a locking member responsive to pressure applied to said conduit and arranged to hold said locking means in its locked position, said locking member being moved to release said locking means from its locked position upon application of fluid pressure to said conduit, a rotatable shaft transversely extending through the interior of said cylinder chamber, a cam fastened to said shaft and rotatable therewith, resilient means for holding said cam against said locking member when the member is in its locking position, said shaft being rotated by said resilient means upon movement of the locking member to unlock said locking means, and a lever arm carried at one end of the shaft adapted for connection with a switch means of a signaling system.

8. In combination with a hydraulic cylinder and a piston movable therein, means carried by said piston for locking the same to said cylinder, said cylinder having a recess formed for receiving said means, a fluid pressure conduit extending into one end of said cylinder to conduct fluid pressure into the cylinder to move said piston, a locking member responsive to pressure applied to said conduit and arranged to hold said locking means in its locked position, and normally closed valve means associated with said locking means to prevent fluid pressure applied to said conduit from acting on said piston, said valve means formed by the overlapping extremities of said fluid pressure conduit and said locking member, said locking member being moved to release said locking means from its locked position upon application of fluid pressure to said conduit, movement of said member being such as to open said valve means after release of said locking means to thereby permit pressure to act on and move said piston.

9. In combination with a hydraulic cylinder and a piston movable therein, means carried by said piston for locking the same to said cylinder, a fluid pressure conduit extending into one end of said cylinder to conduct fluid pressure into the cylinder to move said piston, a pressure responsive locking member arranged to hold said locking means in its locked position, a pressure chamber formed in said locking member for communication with said pressure conduit, and normally closed valve means associated with said locking member to prevent fluid pressure from acting on said piston, said valve having an opening to the pressure chamber which is slidable in relation to said conduit to control the communication between said pressure chamber and conduit, said valve means being opened upon application of fluid pressure from said conduit to move said locking member but only after the locking member has released said locking means from its locked position.

10. In combination with a hydraulic cylinder and a piston movable therein, means carried by said piston for locking the same to said cylinder, a fluid pressure conduit extending into one end of said cylinder to conduct fluid pressure into the cylinder to move said piston, a locking member carried at one end of said piston and arranged to hold said locking means in its locked position, said member being responsive to pressure applied to said conduit, means urging the locking member toward said one end of the cylinder, and normally closed valve means associated with said locking member to prevent fluid pressure from acting on said piston, said valve means formed by the abutting ends of said fluid pressure conduit and said locking member, said valve means being opened upon application of fluid pressure to said port to move the locking member but only after the locking member has released said locking means from its locked position.

References Cited in the file of this patent
UNITED STATES PATENTS

| | | |
|---|---|---|
| 2,150,537 | Berlin et al. | Mar. 14, 1939 |
| 2,204,279 | Meyer | June 11, 1940 |
| 2,249,850 | Palmer | July 22, 1941 |
| 2,349,244 | Brown | May 23, 1944 |
| 2,744,501 | Chace et al. | May 8, 1956 |

FOREIGN PATENTS

| | | |
|---|---|---|
| 715,739 | Germany | Jan. 6, 1942 |
| 907,993 | France | Aug. 6, 1945 |

U. S. DEPARTMENT OF COMMERCE
PATENT OFFICE

CERTIFICATE OF CORRECTION

Patent No. 2,803,222     Peter Bukoff            August 20, 1957

It is hereby certified that error appears in the printed specification of the above numbered patent requiring correction and that the said Letters Patent should read as corrected below.

Column 6, line 29, for "conduit" second occurrence, read -- conduct --.

Signed and sealed this 10th day of June 1958.

(SEAL)
Attest:
KARL H. AXLINE
Attesting Officer

ROBERT C. WATSON
Commissioner of Patents